Oct. 17, 1944.  W. A. HEYMAN  2,360,342
SOLID EXPANDED COFFEE CORN SYRUP
Filed Feb. 28, 1941
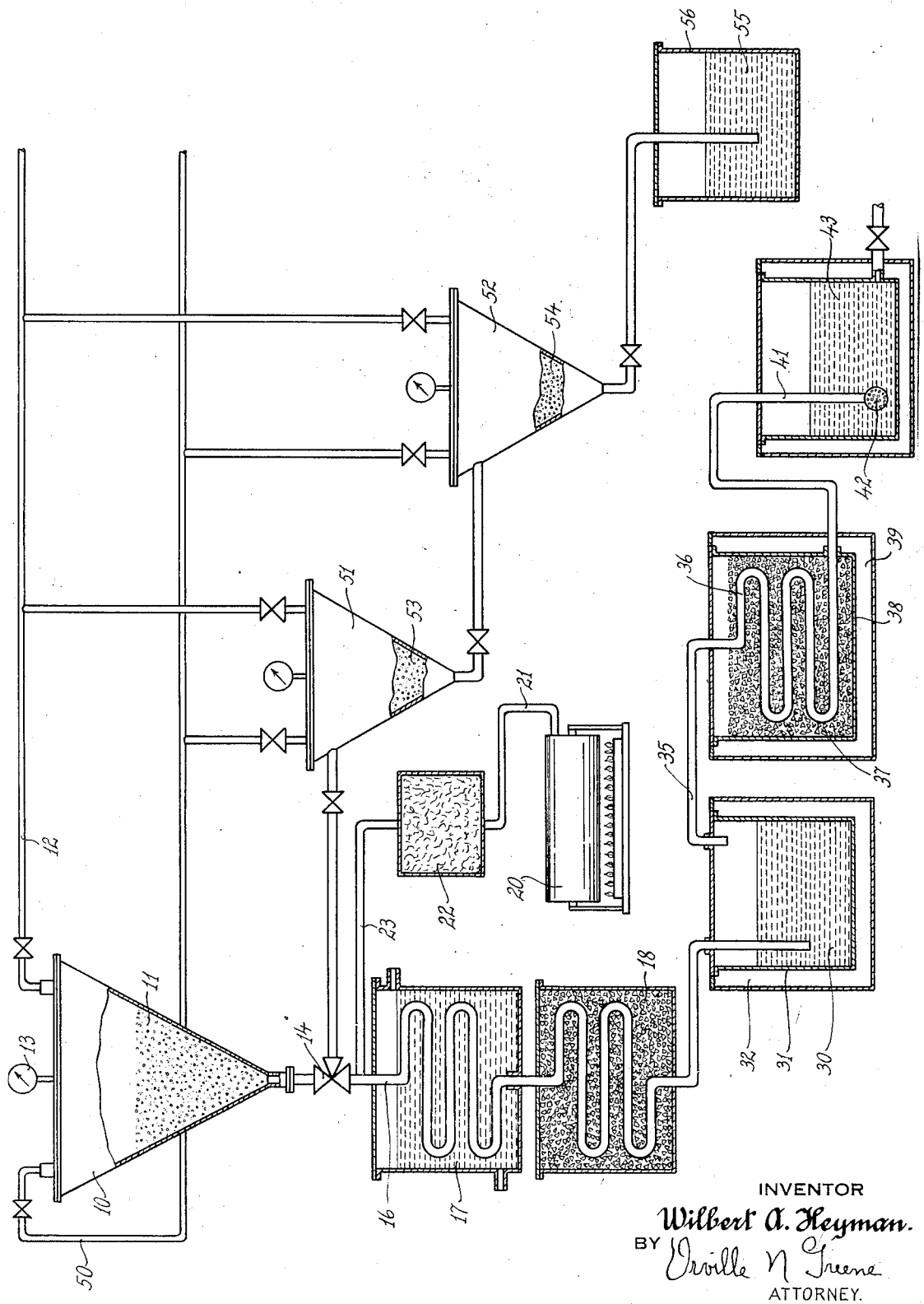
INVENTOR
Wilbert A. Heyman.
BY Orville N Greene
ATTORNEY.

Patented Oct. 17, 1944

2,360,342

UNITED STATES PATENT OFFICE 2,360,342

SOLID EXPANDED COFFEE CORN SIRUP

Wilbert A. Heyman, New York, N. Y., assignor to Granular Foods, Inc., New York, N. Y., a corporation of Indiana Application February 28, 1941, Serial No. 381,061

6 Claims. (Cl. 99—71)

My invention relates to a novel edible product comprising coffee and a starch conversion product such as corn sirup and more particularly my invention relates to a novel solid expanded cellular combination of coffee constituents and corn sirup characterized by an absorbent, channel sponge-like structure.

The art has long recognized the desirability of a solid form of coffee that would be capable of retaining and preserving the desirable aromatic and flavor constituents of coffee in such form as to make such solid readily soluble in aqueous and other liquids so as to make available the aromatic and flavor constituents of coffee in concentrated form.

Many attempts have been made to form such coffee concentrates but hitherto it has not been possible to produce a solid coffee product which comprises all of the desirable coffee constituents and is capable of retaining such desirable constituents in substantially their orignal forms.

Roasted coffee contains a multiplicity of volatile aroma and flavor components which are subject to conversion or oxidation. These volatile aroma and flavor components include furfuryl alcohol, acetaldehyde, pyridine, furan, methylacetylcarbinol, and hydrogen sulphide. Additionally methyl mercaptan, furfuryl mercaptan, dimethyl sulphide, acetyl-propionyl, vinyl guaiacol, acetic acid, and pyrazine have also been isolated from roasted coffee. It will be apparent that these volatile and relatively unstable components are susceptible to change and hence it is important that they be captured and preserved in any coffee concentrate.

It is the object of the present invention to separate out from coffee the volatile constituents including the volatile condensable elements and the volatile elements that are relatively non-condensable, the volatile and relatively non-condensable elements being captured in liquid corn sirup to which is subsequently added the volatile condensable elements and the extract of the soluble solids of the coffee residue from which the volatiles have been distilled.

This mixture of corn sirup with the flavor and aroma elements of the coffee captured therein is then expanded under low heat and high vacuum to form a dry solid which has a sponge-like structure and is readily soluble in aqueous media.

I may further purify the roasted coffee according to the process set forth in my Patent No. 2,154,447 in order to eliminate from the coffee those elements which upon staling develop obnoxious taste and aroma characteristics.

It is a further object of my invention to provide a novel water soluble solid comprising coffee and corn sirup.

It is a further object of my invention to provide a novel product comprising corn sirup and flavor and aroma constituents of coffee which combination is a dry solid which because of its open cell or sponge-like internal structure is capable of taking up and quickly dissolving in aqueous media.

It is a further object of my invention to separate out from a roasted and purified coffee the desirable flavor and aroma elements and incorporate such individual elements in a medium adapted to retain such elements in their preferred form, which medium containing said elements is then expanded under heat and high vacuum to a water soluble solid form.

It is a further object of my invention to capture the vapors and gases given off during the final stage of the roasting coffee and absorb the relatively non-condensable elements thereof in corn sirup which is a solvent therefor, and separate out the condensable constituents of such vapors and gases and add such condensables to the corn sirup carrier.

These and further objects of my invention will become apparent from a consideration of the drawing taken in connection with the description thereof which here follows:

The figure is a diagrammatic representation of the apparatus for carrying out the manufacture of the novel concentrate of my invention.

In the hermetically sealed tank 10 is disposed roasted and ground coffee 11 and through this roasted and ground coffee 11 is passed steam from a steam pipe 12. The pressure of the steam is measurable by the steam gauge 13 and the steam entering the chamber 10 passes through the coffee 11 causing the volatilization of the volatile constituents of the coffee. Steam carrying these volatile constituents passes down through the valve 14 and into a coil 16 which is refrigerated by a suitable refrigerating liquid 17.

Added to the steam carrying the volatiles from the ground coffee 11 are the vapors and gases derived from the final stage of the roasting coffee in the roaster 20, such vapors and gases being conducted through the pipe 21 and thence through a filter 22 which removes dust and other undesirable solids from the vapors and gases, the cleansed vapors and gases passing through the lead pipe 23 into the coil 16.

The desirable vapors and gases are secured only during the final roasting stage of coffee since the vapors and gases given off during the initial roasting of the coffee contain certain undesirable volatile elements which must be excluded. The final stage of the roasting can be determined easily by one skilled in the art by the pleasant odors given off by the roasted hot coffee prior to the completion of the roasting and during the final stages thereof.

The volatiles comprising, therefore, the steam distillants of the ground and purified coffee 11 and the vapors and gases derived from the final stage of the roasting of the coffee in the roaster 20, then pass through the refrigerator coil 16 where condensation conditions are initiated and these volatile elements are further condensed in the chamber 18 where solid ice chills the coil 16 to still a lower temperature and effectuates condensation of those volatile elements which are relatively condensable.

Such condensable constituents are then deposited along with the condensed steam in the form of a liquid 30 in the tank 31. This tank is maintained at a low temperature by means of the refrigerated casing 32. These constituents which are volatile and relatively non-condensable, that is which cannot be condensed by means of reduced temperatures then pass off through the lead off pipe 35 and thence into the coil 36 which is brought to a low temperature by means of the solid carbon dioxide packing 37. This temperature reducing chamber 38 which contains the chilling medium 37 is preferably insulated by the casing 39 to maintain the low temperature conditions. By means of the solid ice temperature reducing medium 37, the volatile and relatively non-condensable constituents of coffee which are in the form of gases are thoroughly chilled to render them more soluble and such low temperature, volatile non-condensables are then passed through the pipe 41 and by means of the spreading nozzle 42 into the liquid corn sirup 43 which is adapted to absorb such volatile non-condensable gases.

To the corn sirup 43 which contains the volatile non-condensables is added the condensate 30 from which I may previously have removed the water contained therein. To this mix, I now add the solution of the soluble solids of the coffee 11 which I obtain by passing hot water from the hot water pipe 50 through the ground roasted coffee residue 11 from which the volatiles have been removed. In order to concentrate this solution of water soluble solids of the coffee 11, I may pass such heated water solution through a multiplicity of tanks 51 and 52 which contain ground and roasted coffee 53 and 54, so that the concentration of the water solution of soluble coffee solids is increased to, for example, a concentration of about 36 degrees Baumé.

This concentrated solution of water soluble coffee solids 55 is then deposited in tank 56. The concentration, alternatively, may be carried out by heating the solution or by eliminating water of the solution in some other known manner.

An alternative method of combining the various elements comprises:

The corn sirup 43 into which is passed the volatile relatively non-condensable gases (which have been volatilized from the coffee) must be sufficiently dilute so that these gases can be absorbed. This dilution may be effected by the addition of a suitable amount of water to the corn sirup or I may add a suitable quantity of aqueous solution of volatile condensables and condensed steam or water 30. By so doing I combine with the corn sirup the volatile condensables which are a factor in the flavor of the final concentrate. The amount of corn sirup 43 which is to be employed depends on the amount of soluble solids of coffee which are dissolved out as the fluid 55. For example, when using 100 lbs. of coffee from which are leached out 20 lbs. of soluble coffee solids, I use a sufficient amount of corn sirup so that the corn sirup solids therein amount to 20 lbs. on a dry weight basis.

The volatile non-condensable gases are captured and retained by the corn sirup thus fixing in the corn sirup all of the aromatic flavor elements which are inherent in the volatile non-condensable gases.

To form my concentrate I then mix together equal parts by weight of the liquid corn sirup 43 which contains the absorbed volatile relatively non-condensable gases and the concentrated solution of coffee solids 55, the equal parts being calculated as dry weight of the solids contained in the corn sirup and the soluble coffee solids solution. The soluble coffee solids solution is concentrated so that each gallon contains about 4.5 lbs. of coffee. The corn sirup, which is of the type known as commercial confectioners corn sirup, i. e., 43° Baumé, contains 9.5 lbs. of solids per gallon. Although I prefer to employ the ordinary commercial confectioners sirup which has a dextrose equivalent of 42 D. E., it is within the purview of my invention to employ corn sirup having dextrose equivalents that are higher or lower than 42 D. E.

Accordingly, one gallon of soluble coffee solids solution is added to and mixed with one half gallon corn sirup.

I then form my coffee corn sirup powder from either of the above set forth alternative methods of combining the constituents by pouring the mix of corn sirup, volatile constituents of coffee and concentrated solution of coffee solids into a shallow pan forming a layer therein of about $\frac{3}{16}$ inch thickness. This liquid mix is then boiled under the highest possible vacuum, for example, on the order of 29 to 30 inches of mercury using the lowest possible temperature, for example, about 95° F. The boiling proceeds until the solution thickens to such a point that the water vapor developed therein by the boiling is trapped in the form of bubbles which bubbles are held in the mass when the liquid thickens to semi-solid form. The continued application of heat and vacuum causes the expansion of the water vapor contained within the bubbles thereby causing the expansion of the bubbles and the entire mass. The expansion is continued until the bubbles burst into one another and break open at the surface to form an intercommunicating cell structure. While in this intercommunicating cell structure form, further heat and vacuum are applied causing the mass to solidify and set, the heat and high vacuum acting then to draw off and drive out the residue moisture within the mass to produce a dehydrated product of extremely low moisture content, of, for example, one-half to two per cent moisture content. This process is set forth in my co-pending application Serial No. 351,266 of which this application is a continuation-in-part.

The intercommunicate cellular solid dehydrated coffee corn sirup mass is then crushed and screened to obtain a particle size which is readily soluble in fluids such as water. The porous intercommunicating cell structure of the particles permits the ready entrance of water into the solid coffee corn sirup particles and hence effects a quick dissolution of the solid in the formation of a beverage.

The ready solubility is another element of extreme importance because it is essential that a composition of this type be very quickly and completely soluble in hot water when the consumer finally makes the desired liquid coffee therefrom.

The low moisture content set forth above makes for a composition that is relatively non-hygroscopic and hence even when exposed to ordinary atmosphere it will not under ordinary conditions of usage cake or ball up or take such form as would interfere with its free flowing particle form. This low moisture content and the resultant non-hygroscopicity is of basic importance in the coffee-corn sirup product for commercial acceptance.

By forming the coffee-corn sirup combination in the intercommunicating cellular structure described above, the above two important characteristics are obtained.

In forming the dry coffee concentrate powder it is the purpose of my invention to recombine the soluble coffee solids with the volatile constituents in substantially the percentages in which they were present in the original coffee. The added corn sirup is present in an amount equal to the amount of soluble coffee solids.

The constituent parts of the coffee-corn sirup combination, namely, the soluble coffee solids, the corn sirup, the volatile condensables and the volatile relatively non-condensable constituents may be variously combined. I have set forth above the preferred methods. It will be understood that alternative processes could be employed.

In order to enhance the flavor of the coffee component which is the essential flavor and aroma ingredient of my product, I have found the two following procedures to be extremely effective. Although these procedures are mentioned here with specific reference to the coffee-corn sirup product of my invention, it is to be understood that they are applicable to the formation of coffee extracts and coffee concentrates generally.

After the steam has been passed through the ground and roasted coffee 11 to distill off therefrom the volatile constituents, certain of the volatile constituents may still remain trapped within the cells of the ground coffee. In order to remove substantially all of this volatile flavor usb-stance, I then subject the entire system to a high vacuum while at the same time continuing the injection of dry steam in order to draw off as much of the volatile flavor substances as possible which will expand and escape through the porous cellular structure of the coffee. These extracted volatiles are then passed through the same trapping system so that the resulting condensables are added to the condensables 30 and the volatile relatively non-condensables are absorbed in the corn sirup 43.

I have further found that I can impart to liquid coffee concentrate a greatly enhanced flavor characteristic of fresh roasted coffee by plunging hot roasted coffee beans directly from the roasting apparatus, the beans being heated to approximately 425° F., into the finished coffee concentrae (25° Bé.). I use about one and one quarter pounds of finished roasted coffee to each quart of liquid coffee concentrate. I prefer to have my liquid coffee concentrate as cold as possible, e. g., at a temperature of approximately 32° F., and surrounded by a cooling material such as brine so that the heat generated from the hot coffee will not appreciably raise the temperature of the concentrate and so that the concentrate can be quickly cooled again. The cold extract thus assists in the condensation of the coffee volatiles.

As the hot roasted coffee strikes the cold liquid concentrate, steam is generated. The steam acts to steam distill the fresh coffee flavor and aroma which flavor and aroma are immediately condensed and absorbed by the liquid coffee concentrate. I allow the roasted coffee beans to remain in contact with the liquid coffee concentrate for a period of about an hour so that a substantial amount of the coffee aroma and flavor can diffuse out of the roasted bean into the liquid coffee.

It is a well known fact that when coffee is freshly roasted it contains a pressure of carbon dioxide of approximately one hundred pounds to the square inch. The water of the liquid concentrate acts to soften the cellular structure of the roasted coffee thereby permitting the gas of the cofifffee to escape in the liquid coffee and carrying with it certain of the flavor and aromatic principles of the coffee. After one hour, I centrifuge the roasted coffee beans to remove as much of the concentrate as posible from the coffee bean. I then grind the roasted coffee and subject it to the various processes of extraction as previously herein outlined.

I may then, if I desire to produce a powder concentrate, proceed to dry the liquid coffee extract at as high a vacuum as possible and at as low a temperature as possible in order to remove all moisture and produce a dry soluble concentrated coffee.

Alternatively for the patricular purposes of producing the dry coffee corn sirup powder, which is the subject of the present invention, I may entrap these desirable aromatic principles and flavor elements of the freshly roasted coffee in corn sirup by plunging such roasted coffee beans directly from the high temperature of the roaster into the cooled corn sirup containing the previously absorbed volatile condensable constituents whereupon the hot freshly roasted coffee bean coming in contact with the cool corn sirup causes the formation of steam and the release of the desirable aromatic and volatile principles contained in the coffee bean which elements are picked up and retained by the corn sirup.

By suitable extraction means I may then remove the coffee beans from the corn sirup and combine the corn sirup containing these aromatic principles with the soluble coffee solids extracted as above set forth.

The operations presently described may take place either before or after the volatile condensables of the coffee have been added to the corn sirup.

As set forth above, this process of securing the aromatic principles and flavor elements of the freshly roasted coffee bean has general application entirely aside from its particular application to the corn sirup process presently described.

The solid dehydrated coffee-corn syrup powder of my invention when dissolved, for example, with hot water to form a coffee beverage is characterized by a superior taste and aroma, both because of the combination of the flavor preserving and retaining effect of the corn sirup with the coffee elements and also because of the fact that the essential flavor and aroma elements of the coffee have been separated out and recombined so as to be retained by the corn sirup.

The new and unexpected advantages resulting from the formation of this coffee corn sirup combination in expanded intercommunicating cell form have been set forth above. It will be understood that the specific procedures above set forth and the proportions recited may be modified in many different ways by those skilled in the art. I intend therefore to be limited not by the specific disclosure herein but only by the claims hereto appended.

I claim:

1. A solid coffee concentrate comprising an expanded dehydrated mixture of soluble coffee solids, volatile condensable constituents, volatile relatively noncondensable constituents, and corn sirup having an intercommunicating cell structure.

2. A coffee concentrate in discrete particle form comprising a solid, expanded, dehydrated mixture of soluble coffee solids, volatile condensable constituents, and corn sirup having an intercommunicating cell structure.

3. A coffee concentrate in discrete particle form comprising a solid, expanded, dehydrated mixture of soluble coffee solids, volatile condensable constituents, volatile relatively non-condensable constituents, and corn sirup having an intercommunicating cell structure, the total dry weight of the soluble coffee solids being substantially equal to the dry weight of the corn sirup.

4. A coffee concentrate in discrete particle form comprising a solid, expanded, dehydrated mixture of soluble coffee solids, volatile condensable constituents, volatile relatively non-condensable constituents, and corn sirup having an intercommunicating cell structure, the soluble coffee solids, volatile condensable constituents and volatile relatively non-condensable constituents being present in amounts substantially the same as their original proportional amounts in the coffee bean.

5. The process of producing an expanded coffee corn sirup mixture which comprises adding to corn sirup the volatile constituents of coffee and the soluble solids of coffee and boiling the said mixture under a vacuum of the order of 29 inches of mercury or more to expand and solidify said mixture until an intercommunicating cell structure is obtained.

6. The process of producing an expanded coffee corn sirup mixture which comprises dissolving the volatile relatively non-condensable constituents of coffee in corn syrup, adding the volatile condensable constituents of coffee to said corn sirup, further adding the soluble coffee solids to said corn sirup mix and boiling said mixture under vacuum of the order of 29 inches or more of mercury to expand and solidify the mixture so as to form an intercommunicating cell structure, and reducing the expanded intercommunicating cellular structure to discrete particle form.

WILBERT A. HEYMAN.